(12) United States Patent
Watanabe et al.

(10) Patent No.: US 7,715,724 B2
(45) Date of Patent: May 11, 2010

(54) OPTICAL SYNCHRONIZER

(75) Inventors: Shigeki Watanabe, Kawasaki (JP);
Masataka Nakazawa, 2-13,
Kunimigaoka 3-chome, Aoba-ku,
Sendai-shi, Miyagi 989-3201 (JP)

(73) Assignees: Fujitsu Limited, Kawasaki (JP);
Masataka Nakazawa, Sendai (JP)

( * ) Notice: Subject to any disclaimer, the term of this patent is extended or adjusted under 35 U.S.C. 154(b) by 960 days.

(21) Appl. No.: 11/057,365

(22) Filed: Feb. 15, 2005

(65) Prior Publication Data

US 2005/0185965 A1  Aug. 25, 2005

(30) Foreign Application Priority Data

Feb. 20, 2004  (JP) ............... 2004-045341

(51) Int. Cl.
*H04B 10/00* (2006.01)
(52) U.S. Cl. ............... 398/154; 398/188; 398/189; 398/191; 398/199
(58) Field of Classification Search ............ 398/148, 398/75, 199, 188–191, 154, 68, 69, 155, 398/193; 385/27
See application file for complete search history.

(56) References Cited

U.S. PATENT DOCUMENTS

| | | | |
|---|---|---|---|
| 5,408,544 A | | 4/1995 | Seino et al. |
| 6,141,127 A * | | 10/2000 | Boivin et al. ............. 398/92 |
| 6,456,750 B1 * | | 9/2002 | Price et al. ............. 385/2 |
| 6,775,478 B2 * | | 8/2004 | Suzuki et al. ............. 398/75 |
| 6,856,737 B1 * | | 2/2005 | Parker et al. ............. 385/122 |
| 6,856,770 B2 * | | 2/2005 | Bai ............. 398/148 |
| 7,103,281 B1 * | | 9/2006 | Poustie ............. 398/154 |
| 7,224,863 B1 * | | 5/2007 | Li et al. ............. 385/27 |
| 2003/0002135 A1 | | 1/2003 | Futami et al. |
| 2003/0063860 A1 | | 4/2003 | Watanabe |

(Continued)

FOREIGN PATENT DOCUMENTS

JP  2003-15097  1/2003

(Continued)

OTHER PUBLICATIONS

European Search Report mailed Nov. 30, 2007 in corresponding European Application No. 07020705.5-2415.

(Continued)

*Primary Examiner*—Ken N Vanderpuye
*Assistant Examiner*—Hibret A Woldekidan
(74) *Attorney, Agent, or Firm*—Staas & Halsey LLP

(57) ABSTRACT

The phase modulation in which the frequency chirp becomes 0 at the timing which the user wants to synchronize, and the frequency chirp becomes larger as the time deviates in a positive or negative direction from this timing is applied to the signal light with each wavelength comprising pulse train of different timing. Thus, the optical pulses which deviate from the timing which the user wants to synchronize receive the frequency chirp in accordance with the amount of the timing deviation. The WDM signal light which has been chirped in this way is made to pass a linear dispersive medium, and the dispersion fit for the amount of frequency chirp is made to be given. By adjusting the amount of dispersion, it is possible to obtain the pulses which conform to the timing at which the user wants to synchronize the pulses of each wavelength.

21 Claims, 13 Drawing Sheets

U.S. PATENT DOCUMENTS

| | | | |
|---|---|---|---|
| 2003/0086647 A1 | 5/2003 | Willner et al. | |
| 2003/0128414 A1 | 7/2003 | Watanabe et al. | |
| 2003/0194240 A1 | 10/2003 | Mollenauer et al. | |
| 2003/0223689 A1 | 12/2003 | Koch et al. | |
| 2004/0253000 A1* | 12/2004 | Grifin | 398/183 |
| 2005/0013618 A1* | 1/2005 | Kurebayashi | 398/188 |

FOREIGN PATENT DOCUMENTS

| | | |
|---|---|---|
| JP | 2003-107541 | 4/2003 |
| JP | 2003-209516 | 7/2003 |

OTHER PUBLICATIONS

European Patent Office Summons to Attend Oral Proceedings, mailed May 29, 2007 and issued in corresponding European Patent Application No. 05003532.8-2415.

N. J. Smith et al., "Gordon-Haus Jitter Suppression Using an Intra-Span Phase Modulator and Post Transmission Dispersion Compensator", IEE Photonics Technology Letters, vol. 8, No. 3, Mar. 1996, pp. 455-457.

Search Report for corresponding European Appln. No. 05 00 3532 dated Jul. 28, 2005.

European Office Action dated Jun. 16, 2006 in the corresponding European Application No. 05 003 532.8.

N. J. Smith et al., "Gordon-Haus Jitter Suppression Using an Intro-Span Phase Modulator and Post Transmission Dispersion Compensator", IEEE Photonics Technology Letters, vol. 8, No. 3, Mar. 1996, pp. 455-457.

D. Norte et al., "Demonstration of an All-Optical Data Format Transparent WDM-To-TDM Network Node with Extinction Ration Enhancement for Reconfigurable WDM Networks", IEEE Photonics Technology Letters, IEEE Inc., New York, vol. 8, No. 5, May 1996, pp. 715-717.

H. Tanaka et al., "60Gbit/s WDM-OTDM transmultiplexing using an electro-absorption modulator", Optical Fiber Communication Conference (OFC), Technical Digest PostConference Edition, Anaheim, CA, Mar. 17-22, 2001, Trends in Optics and Photonics Series, TOPS, vol. 54, Washington, WA: OSA, pp. ME41-ME43.

M R H Daza et al., "All-Optical WDM0to=TDM Conversion with Total Capacity of 33 GB/S for WDM Network Links", IEEE Journal of Selected Topics in Quantum Electronics, IEEE Service Center, vol. 3, No. 5, Oct. 1997, pp. 1287-1294.

Search Report for corresponding European Appln. No. 05 00 3532 dated Oct. 14, 2005.

* cited by examiner

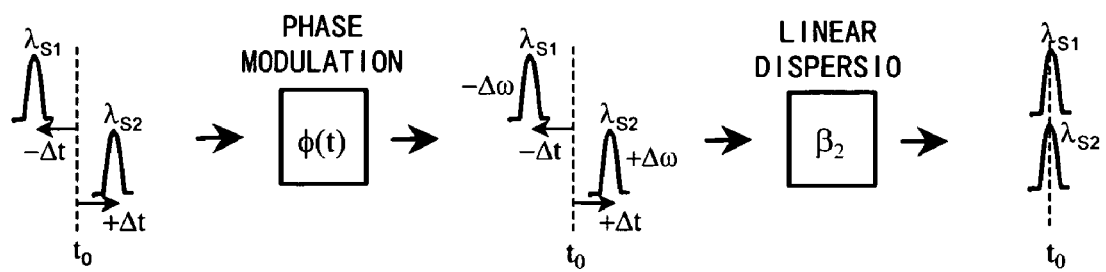
F I G. 1

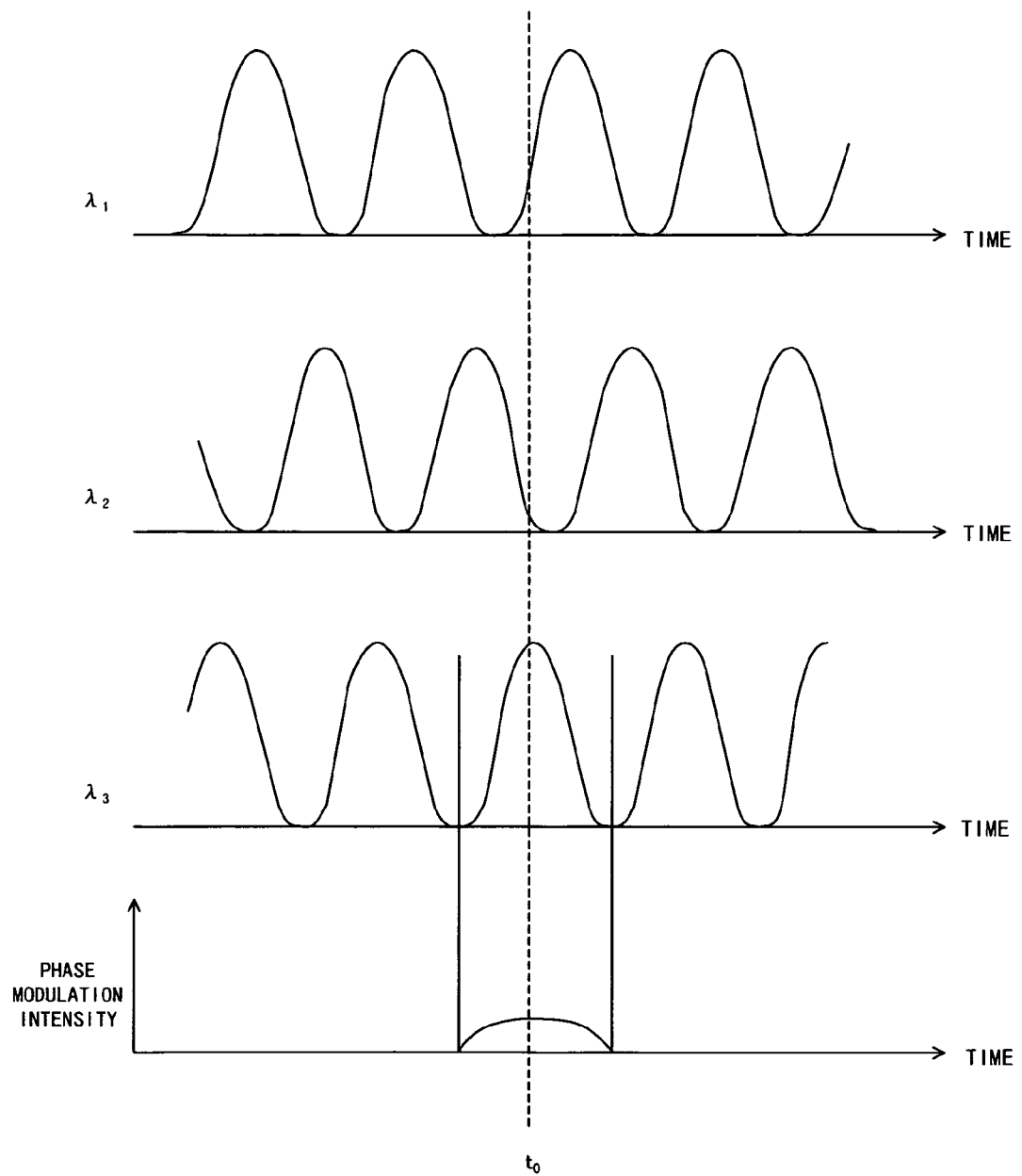
F I G. 3

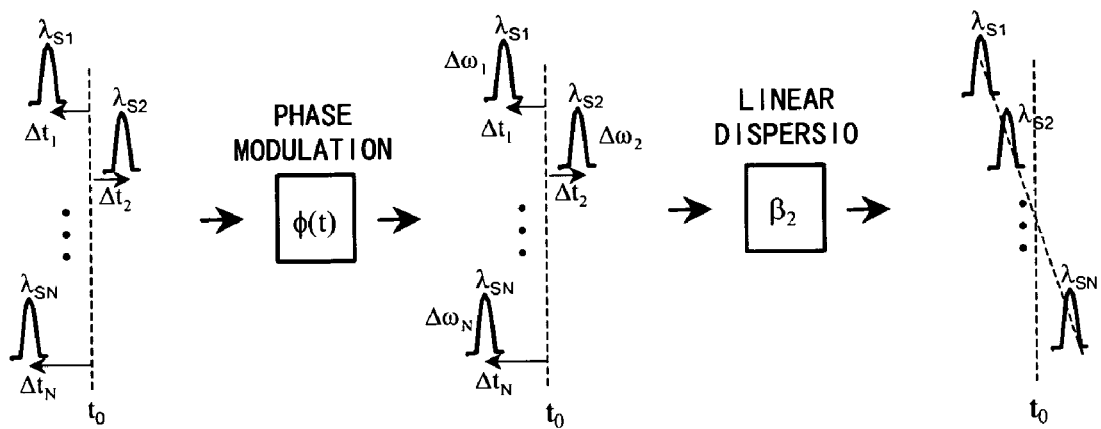
F I G. 6

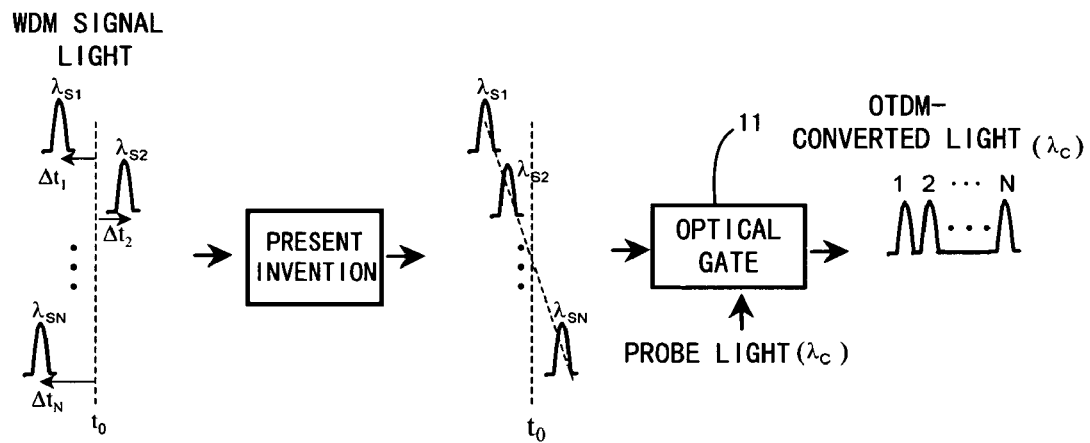
F I G. 7

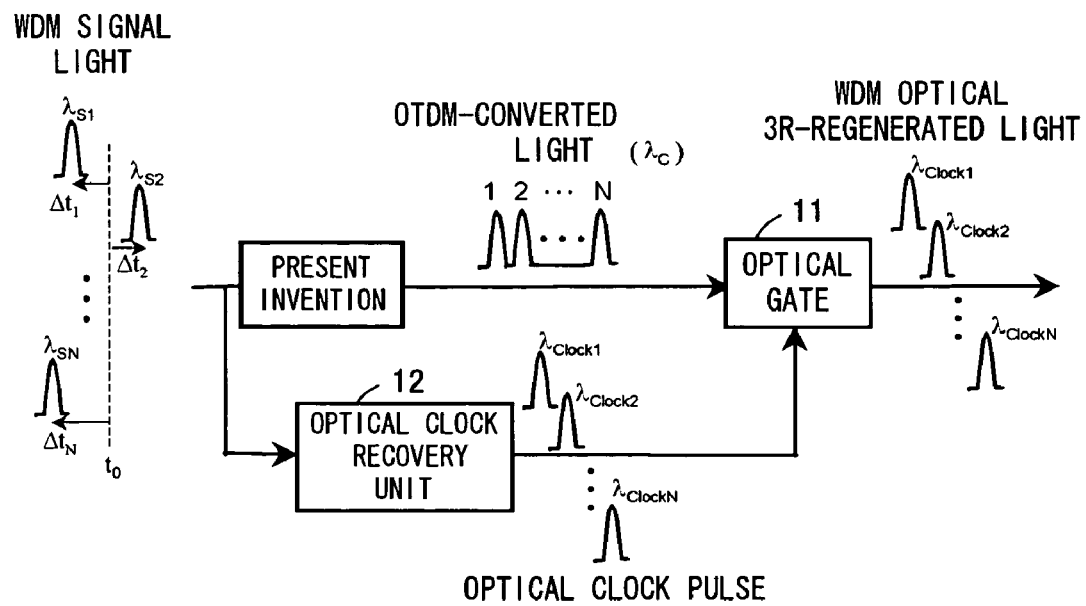
F I G. 9

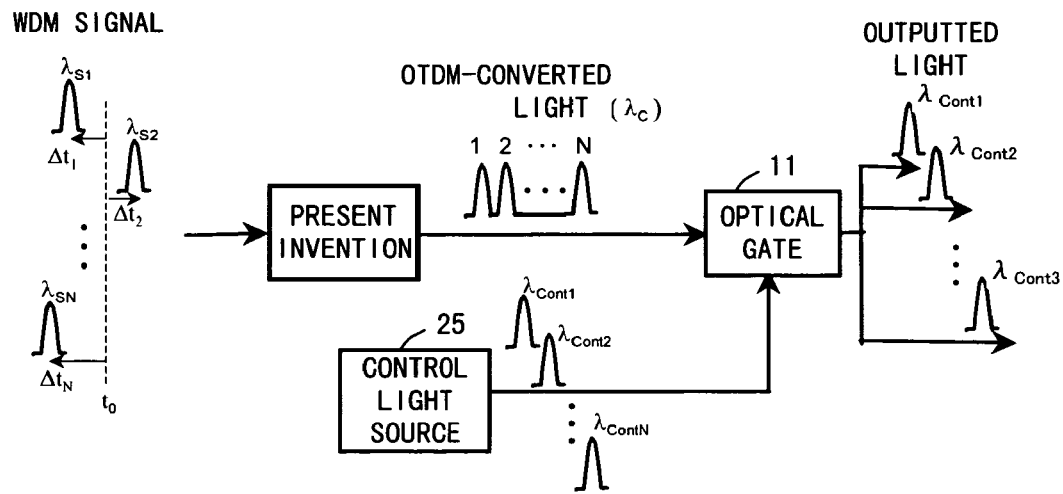
F I G. 1 1

OPTICAL SYNCHRONIZER

BACKGROUND OF THE INVENTION

1. Field of the Invention

The present invention relates to an optical synchronizer which synchronizes the timing of signal light with a plurality of wavelengths, the timing of which is not synchronized (asynchronous) in terms of time.

2. Description of the Related Art

Optical signal processing technologies have been studied to break through the present performance limit of optical technology. Optical signal processing technologies such as signal light regeneration, an optical switch, and wavelength conversion are expected to be realized. In order to realize said technologies, an all-optical signal processing technology which executes entire processing at a level of light using an ultra-wide band and ultrahigh-speed characteristics of light is promising, and a great deal is expected of this technology as that which realizes a transparent action without depending on the bit rate, pulse shape, etc. of a signal. In such an all-optical type of signal processing, generally, nonlinear optical effects are used, and since many of nonlinear optical effects have an ultrahigh-speed processing performance, the all-optical signal processing can be expected to produce a far superior performance than a conventional opto-electric conversion type of signal processing. Other functions which can be expected to be realized by the all-optical signal processing technology, but cannot be realized by the opto-electric conversion type signal processing are the functions which process multiple wavelengths simultaneously. One method which realizes the function which processes multiple wavelengths is to convert an asynchronous signal whose wavelength has been multiplexed into a synchronizing signal of one wavelength. If this function is realized, the ultrahigh-speed characteristics of all-optical signal processing can be put to practical use, and a compact signal processing device can be realized.

Described in Patent Document 1 is the method of forming the waveform of signal light, and the technology which enables waveform shaping of signal light as it is without depending on a modulation rate and format is disclosed therein. Described in Patent Document 2 is the method of performing waveform shaping of signal light, and the technology which realizes 3R functions of signal light as it is disclosed therein. In Patent Document 3, the technology for performing waveform shaping of signal light is also disclosed.

Patent Document 1: Kokai (Jpn. unexamined patent publication) 2003-15097

Patent Document 1: Kokai (Jpn. unexamined patent publication) 2003-107541

Patent Document 1: Kokai (Jpn. unexamined patent publication) 2003-209516

There is an optical 3R signal regeneration technology as one of the main optical signal processing technologies. In this case, generally, signal light which should be 3R-regenerated and a recovered optical clock pulse are inputted to an optical switch as an optical AND circuit, and data which the signal light has is transferred to the regenerated optical clock pulse by the AND operation. The optical 3R regeneration of 160 Gb/s has already been experimented and verified using an optical switch using nonlinear optical effects in an optical fiber. For example, the response time of nonlinear optical effects in an optical fiber is as fast as a femtosecond order, so that nonlinear optical effects have a possibility of realizing optical 3R regeneration of a Tb/s order. The biggest problem is how compactly signal processing can be realized for a wavelength division multiplex signal.

SUMMARY OF THE INVENTION

The purpose of the present invention is to provide an optical synchronization technology for realizing a compact optical signal processing device and its applications.

The optical synchronizer of the present invention is characterized in that it comprises a phase modulation unit for inputting signal light with a plurality of wavelengths and performing phase modulation so that a frequency chirp is applied to the pulse of the signal light as the frequency deviates centered around a prescribed timing and from the prescribed timing, and a delay unit for giving a time delay corresponding to the frequency to the pulse of the signal light to which the frequency chirp is applied and conforming the timing of the pulse of the signal light with a plurality of wavelengths to the prescribed timing.

A WDM signal light, each pulse of which is sent at a random timing can be converted into a pulse signal having a synchronous timing without using any means which performs opto-electrical conversion such as electrical processing by the processing in the state of signal light. In other words, it is possible to provide an optical synchronizer whose operation is fast and whose size is compact, by means of the technique in which a desired frequency chirp is given to an optical pulse, and a time delay fit for the size of the frequency chirp is given to adjust the timing of the pulse.

According to the present invention, since an optical synchronization technology is provided, it is possible to provide the method, device and system for realizing optical 3R regeneration and ultrahigh-speed optical switch functions simultaneously for the WDM signal using this optical synchronization technology.

BRIEF DESCRIPTION OF THE DRAWINGS

FIG. 1 shows the basic principle of the embodiment of the present invention.

FIG. 3 shows the outline of how to perform optical phase modulation in the embodiment of the present invention.

FIG. 6 shows a second embodiment of the present invention.

FIG. 7 shows the outline of the device which converts a WDM signal into an OTDM signal using the second embodiment of the present invention.

FIG. 9 shows the outline of the device which further applies the application example of the second embodiment of the present invention shown in FIG. 8.

FIG. 11 shows the configuration in which an OTDM signal is switched by an optical gate using optical pulses which are controlled so as not to overlap each other in terms of time.

DESCRIPTION OF THE PREFERRED EMBODIMENTS

Figure 2:
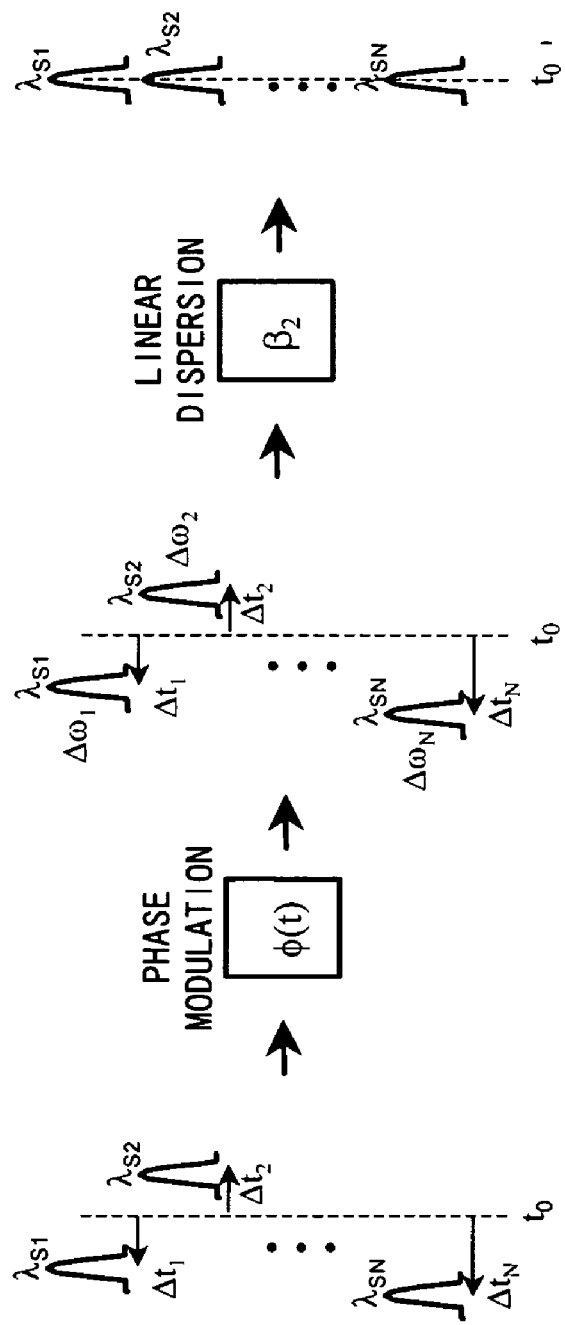
FIG. 2 shows the basic configuration of the embodiment of the present invention using the principle shown in FIG. 1.

In the embodiment of the present invention, the problem is solved by the following means.

(1) After signal light with a plurality of wavelengths is combined, the combined signal light is inputted into an optical phase modulator, and optical phase modulation centered around a reference timing is applied to the combined signal light.

(2) Being inputted into the medium which gives a time delay corresponding to the frequency, the signal light with a plurality of wavelengths is aligned with the reference timing.

The deviation of timing and the jitter of the signal light can be suppressed by these two means, and the signal light of entire wavelengths can be synchronized with the reference timing at the same time. Described below are the details of the embodiment of the present invention with reference to the accompanying drawings.

FIG. 1 shows the basic principle of the embodiment of the present invention. Now, it is presumed that signal light pulses with wavelength λ s1 and wavelength λ s2 deviate for reference time $t_0$ by $-\Delta t$ and $+\Delta t$ respectively. Phase modulation centered around $t_0$, is applied to the signal light with these two wavelengths, and the frequency chirp of $-\Delta\omega$ and $+\Delta\omega$ is given to the signal light. Here, $\Delta\omega$ is a frequency change given by phase modulation $\phi(t)$ centered around to.

[Formula 1]

$$\Delta\omega(t) = \frac{\partial \phi(t)}{\partial t} \tag{1}$$

In this way, by inputting to a dispersive medium the signal light with two wavelengths in which the amount of chirp proportional to the deviation from the reference time is given and adjusting the dispersion amount and group velocity, the timing of the centers of the two-wavelength signal light pulses is made to conform. Here, a linear dispersive medium means a medium which gives a different delay according to the value of the chirp amount which is given to the optical pulses. The more the above-mentioned amount of timing deviation from the reference time (reference timing), the more the amount of chirp given to the optical pulses becomes, and since the delay is given in proportion to the amount of chirp in a linear dispersive medium, it is possible to conform the optical pulses which have variously deviated from the reference time after the signal light has passed through the linear dispersive medium.

In other words, it is possible to conform the optical pulses which have variously deviated from the reference time to timing to by inputting the signal light into the dispersive medium in which the pulses which receive a negative frequency chirp become fast (slow) and the pulses which receive a positive frequency chirp become slow (fast).

In the phase modulation of this method, it is preferable that the amount of frequency chirp is larger compared with the difference of the wavelengths of signal light (the difference of frequencies corresponding to the difference of the wavelengths of signal light). However, the difference of group velocity according to the difference of wavelengths can be compensated for by the dispersive medium having group velocity characteristics of opposite sign, etc. When the phase modulation is insufficient, and when the adjustment accuracy of dispersion amount, etc. is insufficient, it is possible to improve the effect of conforming the optical pulses to the reference time by executing this method repeatedly.

FIG. 2 shows the basic configuration of the embodiment of the present invention using the principle shown in FIG. 1.

Phase modulation $\phi(t)$ centered around reference time $t_0$ is applied to the WDM signal light of N wavelengths in λ s1, λ s2, . . . , and λ sN to give chirp $\Delta\omega 1, \Delta\omega 2, \ldots$, and $\Delta\omega N$ to each wavelength. By inputting the WDM signal light to which the amount of frequency chirp proportional to the deviation from the reference time is given into the linear dispersive medium and adjusting the dispersion amount, the timing at the centers of all the WDM signal light is made to conform simultaneously (embolic optical synchronization).

As the phase modulation used here, all kinds of phase modulators such as an $LiNbO_3$ phase modulator can be used. As the linear dispersive medium, all kinds of dispersion compensating media such as optical fiber and fiber grating can be used.

The phase modulation in this embodiment is to apply phase modulation which can give the amount of chirp proportional to the deviation of optical pulses in terms of time. When considering formula (1), a phase modulator having phase modulation characteristics proportional to the square of time $$\phi(t) = A\exp[2\pi i p(t-t_0)^2] \tag{2}$$

is required. Here, A means a phase modulation index, and p means a modulation frequency. In the case of an LN modulator, for example, since the modulation characteristics are a cosine function, $$\phi(t) = A\cos[2\pi i p(t - t_0)] \tag{3}$$

$$\approx [1 - (\pi p)^2 (t - t_0)^2]$$

in the range close to $t_0$ ($|t-t_0| \ll 1$), and almost all necessary conditions are satisfied. However, when there is any necessity of giving a linear chirp up to a wide range where such an approximation as formula (3) does not hold good, a phase modulator having square characteristics up to the wide range is required.

FIG. 3 shows the outline of how to perform phase modulation in the embodiment of the present invention. In FIG. 3, signal pulses with wavelengths $\lambda_1$ to $\lambda_3$ are coming at different timing. A phase modulator applies phase modulation whose modulation intensity is of a parabolic shape to the wavelength division multiplexing light at predetermined periodical timing (at a desired time interval), as indicated in the bottom of FIG. 3. $t_0$ shown in FIG. 3 is the time indicating the arbitrary timing which the system requests, and indicates the timing at which the user wants to synchronize the optical pulses. This phase modulation is such that the frequency chirp which is the time derivative of phase modulation becomes 0 at timing $t_0$, as known from FIG. 3, and the more the phase modulation deviates from time timing $t_0$, the more the amount of frequency chirp becomes in both directions, positive and negative. In an LN phase modulator, such phase modulation can be realized by using the vicinity of the maximum value of cosine function-like modulation characteristics. This is because the modulation characteristics become nearly proportional to the square of time in the vicinity of the maximum value of the LN phase modulator, as shown in formula (3)

above. Also, as the phase modulator, the one made of LiNbO$_3$ is considered, but it is possible to make a phase modulator having modulation characteristics closer to the modulation characteristics proportional to the square of time by changing the material constituting the phase modulator. For example, as the material of the phase modulator for applying a parabolic type of phase modulation, a material called PLZT is available, and use of this material makes the parabolic modulation of a few GHz to 10 GHz possible. Use of an organic substance also makes this possible.

Further described below is the method of XPM (Cross-Phase Modulation) which is generated in a third-order nonlinear medium as an example of the method of giving phase modulation proportional to the square of time.

Figure 4:
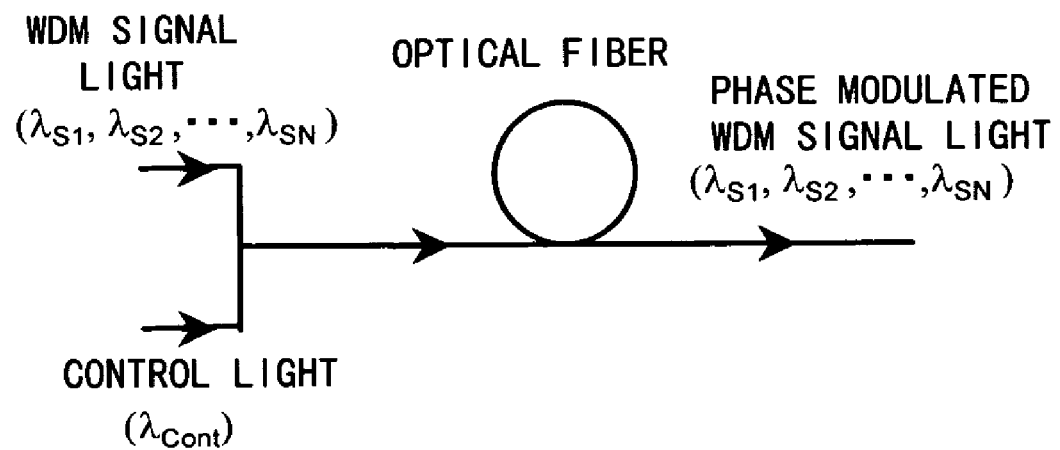
FIG. 4 shows the outline of the configuration of the device for giving phase modulation by means of XPM.

FIG. 4 shows the outline of the configuration of the device for giving phase modulation by means of XPM. As shown in FIG. 4, control light U(t) whose wavelength differs from signal light (wavelength $\lambda_{Cont}$) is inputted into an optical fiber 10, and phase modulation is applied to the signal light by means of XPM which is proportional to the square of time. At that time, the phase modulation is applied so that the intensity change of the control light is proportional to the square of time (or, becomes a Gaussian function). That is, $$U(t) = \exp\left[-\frac{(t-t_0)^2}{\tau^2}\right] \quad (4)$$

Here, τ means the half width of a 1/e value of a Gaussian pulse. The XPM which is given to the signal light by this U(t) is proportional to $|U(t)|^2$, and therefore, from formulas (1) and (4), the chirp amount is given by $$\Delta\omega(t) = (t-t_0)\exp\left[-\frac{2(t-t_0)^2}{\tau^2}\right] \quad (5)$$

From formula (5), it is known that a linear chirp can be given in a wide range.

When an LiNbO$_3$ phase modulator is used, an LiNbO$_3$ intensity-modulator is further connected tandem, and by controlling the driving voltage, the deviation of modulation characteristics of the LiNbO$_3$ phase modulator can be compensated for using the frequency chirp characteristics which the LiNbO$_3$ phase modulator has, and can be adjusted so that the LiNbO$_3$ phase modulator has characteristics closer to the square characteristics for the time shift from a reference time as the overall phase modulation characteristics.

Figure 5:
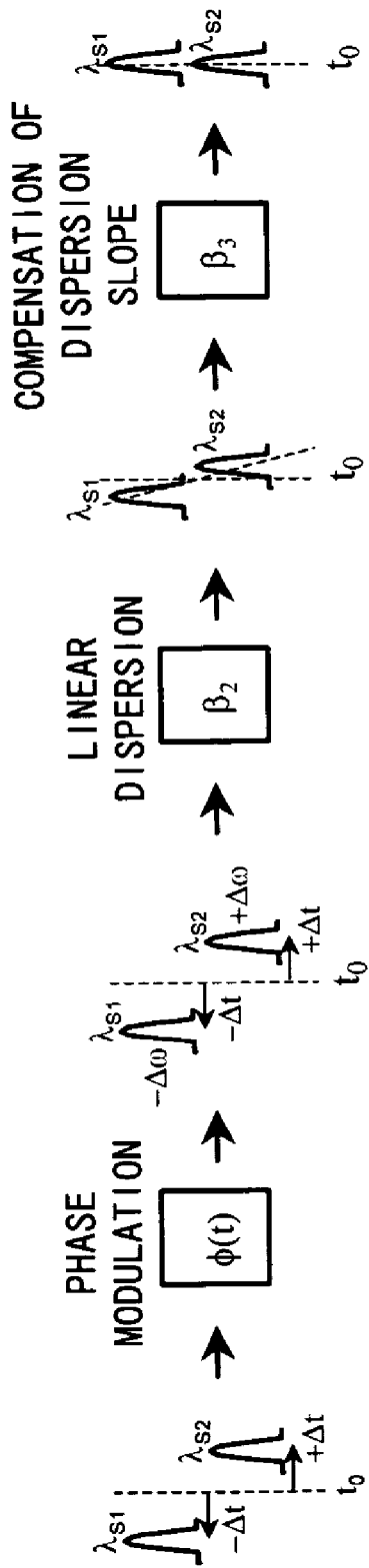
FIG. 5 shows the case where a dispersive medium has a dispersion slope.

FIG. 5 shows the case where a dispersive medium has a dispersion slope. For example, when an optical fiber is used as the dispersive medium, the ideal alignment may not be attained due to the influence of the dispersion slope, as shown in FIG. 5. In such a case, the influence of the dispersion slope can be compensated for by an optical fiber having a dispersion slope of opposite sign, etc. FIG. 5 shows the method of alignment with a desired time position using an optical fiber of a negative dispersion slope, for example, when the dispersion slope makes a signal with two wavelengths which are λ s1<λ s2 pass through a normal dispersive (the dispersion becomes large to the extent that the wavelength becomes long) optical fiber with a positive dispersion slope. All kinds of devices such as an optical fiber and fiber grating in which the compensation of dispersion slope is possible can apply to this dispersion slope compensation in the same way as a dispersive medium.

FIG. 6 shows a second embodiment of the present invention. This embodiment positively uses the dispersion slope of the dispersive medium shown in FIG. 4, and WDM signal light can be thereby shifted in terms of time in the order of a wavelength as occasion arises. In other words, even if the dispersion of the dispersive medium is set so that optical pulses are synchronized with the same timing, the optical pulses are set to different timing according to each wavelength because the dispersion slope exists. How this timing is set depends on the characteristics of the dispersion slope, and it is possible to output optical pulses of each wavelength while changing the timing so that the optical pulses of each wavelength do not overlap each other by adjusting the dispersive slope. By using this embodiment and an optical gate device, a WDM signal can be converted into an OTDM (Optical Time Division Multiplexing) signal simultaneously, as shown in FIG. 7. In this method, when group velocity differs according to each wavelength, it is also possible to use this difference of group velocity.

FIG. 7 shows the outline of the device which converts a WDM signal into an OTDM signal using a second embodiment. After the signals of each wavelength are set so that they do not overlap each other in terms of time according to the embodiment of the present invention, the signals are inputted into the optical gate device together with CW light with wavelength λc to convert them into OTDM lights with λc using optical pulses produced by the embodiment of the present invention by switching the CW light with wavelength λc using the optical gate device, as shown in FIG. 7. In this way, it is possible to convert WDM signal light into OTDM signal light with one wavelength simultaneously according to the embodiment of the present invention.

Shown below is an example of applications of the system which uses the embodiment of the present invention.

Figure 8:
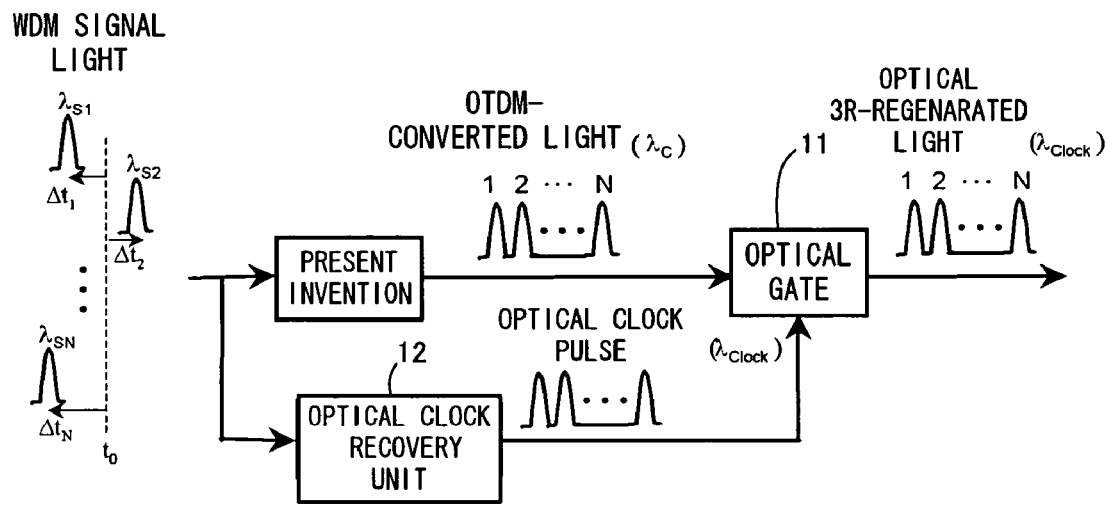
FIG. 8 shows an application example of the second embodiment of the present invention.

FIG. 8 shows an example of applications of a second embodiment of the present invention. This is an example of applications in which optical 3R regeneration of the OTDM signals is performed, wherein regenerated signals with wavelength $\lambda_{Clock}$ are obtained by inputting the signal light which has converted WDM signal light into OTDM signal light according to the second embodiment of the present invention into the optical gate (optical switch) device 11 together with optical clock pulses with wavelength $\lambda_{Clock}$ which are recovered from WDM signal light in an optical clock recovery unit, and transferring data which the OTDM signals have to the optical clock pulses. In this case, it is possible to perform 3R regeneration of WDM signal light of N channels using one optical gate. As the optical gate 11, all kinds of optical gates such as an optical switch using the second-order or the third-order nonlinear optical effects are applicable.

FIG. 9 shows the outline of the device which further applies the application example of the embodiment of the present invention shown in FIG. 8. Shown in FIG. 9 is the configuration in which the WDM signals for which optical 3R (Reamplification, Retiming and Reshaping) regeneration is performed are outputted using the optical clock (the frequency corresponds to the basic bit rate of each channel of original WDM signals) with a regenerated N wavelength. If attention is paid to the input and output, optical 3R regeneration can be performed for WDM signals simultaneously by this configuration.

In the optical clock recovery unit 12, by extracting, for example, the clock of a signal of 10 Gb/s from WDM signal light, expanding a spectrum of this signal clock, producing a super continuum, taking out pulses with different wavelengths, and delaying the pulse of each wavelength according to each wavelength by a dispersive medium, etc., the signal is adjusted so that wavelength $\lambda_{Clock1}$ conforms to pulse 1 of the OTDM-converted light, wavelength $\lambda_{Clock2}$ conforms to pulse 2 of the OTDM-converted light, and wavelength $\lambda_{ClockN}$ conforms to pulse N of the OTDM-converted light, and is inputted into the optical gate 11. In the optical clock recovery, the optical clock pulse of a reference time interval is recovered from signal light in which a time interval has been disturbed. In the case of signal light of 160 Gb/s, for example, pulse train of 160 GHz arrayed at an interval of 6.25 ps are recovered. In this clock recovery, a method in which after O/E conversion is performed, clock signal is electrically recovered, and a mode locked laser (MLL) and other pulse lasers are oscillated using an electric RF clock signal, or a method in which an MLL is directly oscillated without conversion into electricity are used. However, in the case of such a high-speed signal as 160 Gb/s, the speed exceeds a working speed limit of electronics, and a pulse laser which operates at a speed as fast as 160 Gb/s does not exist. Therefore, it is possible to use a method in which after pulse train of a lower speed, for example, 10 GHz are regenerated, clock pulses of 160 GHz are made by the OTDM.

In the optical gate 11, switching processing of the optical clock pulses is performed by the OTDM-converted light, and data which is loaded from the WDM signal light to the ODTM-converted light is reloaded on the optical clock pulses. The optical gate 11 is the one for suppressing waveform degradation and the jitter of optical pulses. A transparent and high-speed switching operation is required, and problems described below sometimes occur thereby. Since signal light includes fluctuations in terms of time, there are some parts which deviate a little from the part synchronized with clock pulses in an optical AND circuit. For example, when a high-speed optical switch such as an NOLM (Nonlinear Optical Loop Mirror) is used as the optical AND circuit, the amplitude of converted pulses does not become constant owing to the aforesaid deviation. Therefore, if the optical signal to be regenerated has jitter, amplitude noise is included in the converted light.

In order to avoid the addition of such noise, the method of making the shape of pulses of the signal light inputted into the optical AND circuit flattened-top is effective. Since an optical AND operation synchronized with the clock pulses always becomes possible by this method, the addition of such amplitude noise as mentioned above can be suppressed, and noise such as jitter can be further suppressed. This method of producing a flattened-top-shaped pulse is disclosed in Patent Application No. 2000-34454. As the method of producing a flattened-top-shaped pulse, the method of using fiber grating and the method of dividing an optical pulse into two orthogonal polarized waves to delay them in terms of time and then polarization re-combining them are considered in addition to the method of using a normal dispersive fiber.

In this way, when the embodiment of the present invention is used, the 3R regeneration of WDM signal light can be performed simultaneously. Conventionally, the 3R regeneration of WDM signal light got back to WDM signal light by dividing the signal light into each wavelength, and performing 3R regeneration for the signal light of each wavelength, and combining the signal light of each wavelength after said regeneration. However, because of the recent increase of wavelength multiplicity, the conventional method is not preferable, for example, in the system in which 100 waves are wavelength-multiplexed considering the cost and the size of the device. In the present invention, however, the enbloc 3R regeneration of WDM signal light is made possible, and a compact and inexpensive WDM 3R regenerator can be constituted.

Figure 10:
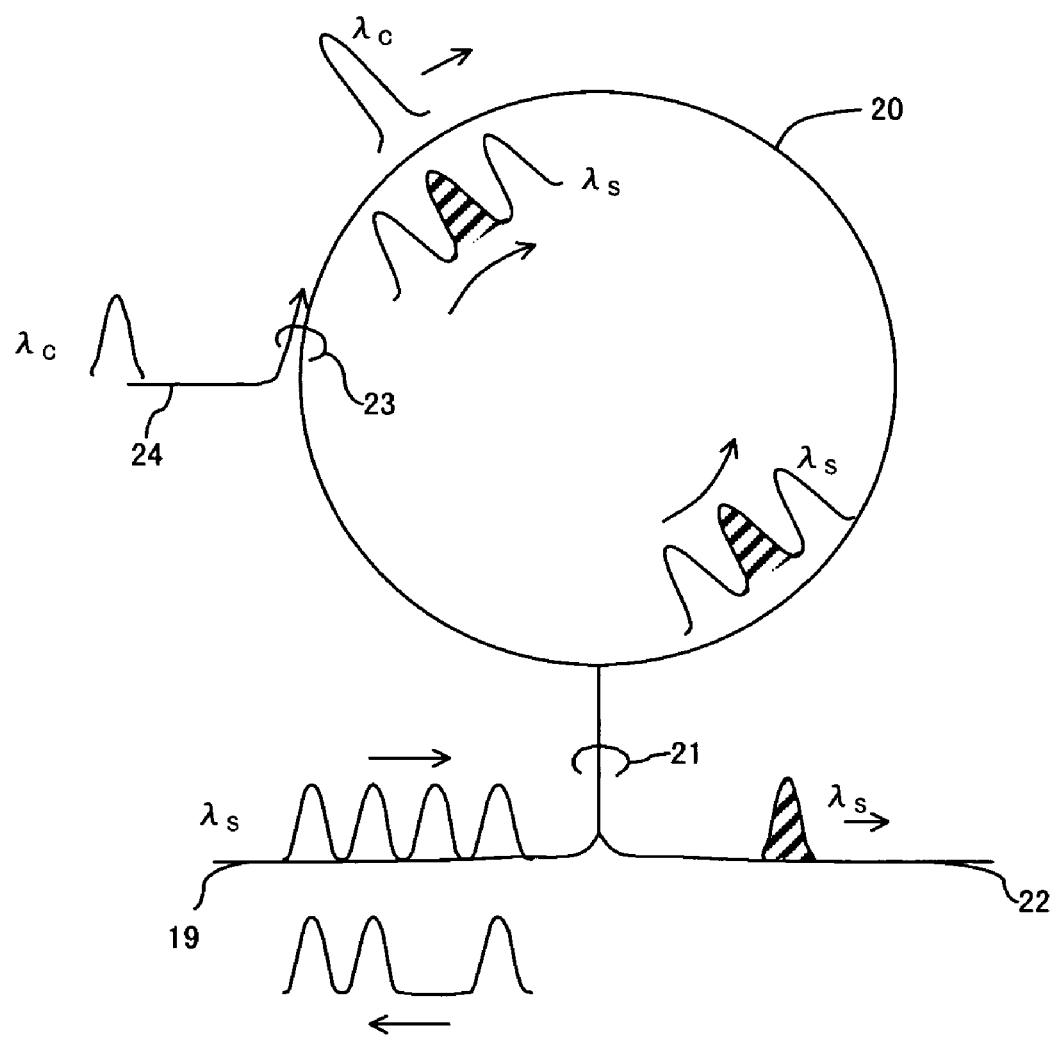
FIG. 10 shows the outline of the operation principle of an NOLM as an optical AND circuit.

FIG. 10 shows the outline of the operation principle of the NOLM as an optical AND circuit. The NOLM comprises an optical path 19 which inputs an optical clock signal with wavelength λs, an optical path 22 which sends out selected optical pulses with wavelength λs, an optical coupler 21, an optical path 24 which inputs signal light with wavelength λc, and an optical coupler 23 which inputs this signal light into a propagation loop 20.

An optical clock signal inputted from the optical path 19 is divided into two in the optical coupler 21, and propagates the propagation loop in both clockwise and counter-clockwise directions. The signal light is inputted into the clockwise direction from the optical path 24, and the signal light turns around the propagation loop 20 clockwise together with the optical clock signal. At that time, if the timing of the optical pulses of the signal light is made to conform to that of the optical pulses of the optical clock signal which the user wants to extract, phase modulation is applied to the optical pulses of the optical clock signal by means of XPM. When the optical clock signals which have turned in clockwise and counter-clockwise directions meet each other again in the optical coupler 21, only the optical pulses which have received the XPM are extracted to the optical path 22 by the signal light. The operation of the optical clock signal and the optical pulses of the signal light as an AND circuit is thereby accomplished.

As an optical gate which realizes these embodiments, the second-order or the third-order nonlinear optical effects are effective. As a second-order nonlinear medium, an $LiNbO_3$ modulator (PPLN: Periodically Poled Lithium Niobate) having a pseudo-phase matching structure, etc. is effective, and as a third-order nonlinear medium, an optical fiber, a semiconductor optical amplifier having a quantum well or quantum dot structure, etc. are effective. As an optical fiber, in particular, optical fibers whose nonlinear effects have been increased such as a high-nonlinear fiber, a photonic crystal fiber, or a Holey fiber disclosed in the Patent Application are effective.

FIG. 11 shows the configuration in which an OTDM signal is switched by an optical gate using optical pulses which are controlled so as not to overlap each other in terms of time. In this configuration, a basic optical switching function which is required for an optical node such as an optical DEMUX or optical Drop function is realized.

First, WDM signal light is converted into an OTDM-converted light with wavelength λc by a device based on the embodiment of the present invention. From a light source 25, a group of pulses which shift optical pulses with wavelength $\lambda_{cont1}$ to $\lambda_{ContN}$ by the pulse interval of the OTDM-converted light are produced, and are inputted into the optical gate 11 using a different transmission path. In the optical gate 11, an optical AND circuit of the aforesaid wavelengths is provided, and each wavelength pulse transmitted from the control light source 25 is switched and outputted using the OTDM-converted light. At that time, the timing of wavelength $\lambda_{Cont1}$ conforms to that of pulse corresponding to the first channel of the OTDM-converted light, and the timing of wavelength $\lambda_{Cont2}$ and wavelength $\lambda_{ContN}$ is made to conform to that of the second channel and that of Nth channel respectively. Then, information of the WDM signal light which is loaded on the OTDM-converted light is re-loaded on the pulses of each wavelength from the control light source 25. Thus, the state in which the wavelength of the WDM signal light is separated can be produced.

Concerning the way how the pules of each wavelength are produced in the control light source 25, the pulses of each wavelength may be produced by receiving a plurality of light sources which produce pulses of each wavelength or by expanding the spectrum of the pulses of one wavelength, extracting the pulses of each wavelength from the spectrum, and giving a delay according to each wavelength by a dispersive medium.

It is also possible to perform time division separation of the OTDM signal of a single wavelength in a similar configuration. In this case, for example, as described above, after the OTDM signal is separated into signal light of each wavelength, the signal light of one wavelength which is Optical-Time-Division-Multiplexed in each wavelength is inputted into the optical gate, and the control light produces optical pulse light of one wavelength. The production of pulses by the control light is so conducted as to conform to the timing of the pulses which the user wants to extract among the OTDM signals, and reload information from the signal light which is Optical Time division Multiplexed by the control light in the optical gate 11. The signal of one channel of OTDM signal light can be thereby taken out. By conducting this operation for a plurality of timing, it is possible to take out information of pulses at each timing of OTDM signals, namely information of each channel which has been Optical-Time-Division-Multiplexed.

The wavelength separation and the OTDM channel separation have been separately explained above, but according to the configuration shown in FIG. 11, it is possible to carry out the wavelength separation and the channel separation at the same time. In other words, WDM signal light is converted into an OTDM-converted light in accordance with the embodiment of the present invention, and the OTDM-converted light is inputted into the optical gate 11, as shown in FIG. 11. The control pulse is produced so that the timing conforms to the pulse in the OTDM-converted light with the wavelength which the user wants to take out and the channel which the user wants to take out. Thus, in the optical gate 11, the control pulse is processed by the pulses having information of a specified channel with a specified wavelength, and the pulses which are outputted become signal light having information of a desired channel with a desired wavelength. When this operation is conducted for the whole channels, it is possible to carry out the wavelength separation and the channel separation at the same time.

Figure 12:
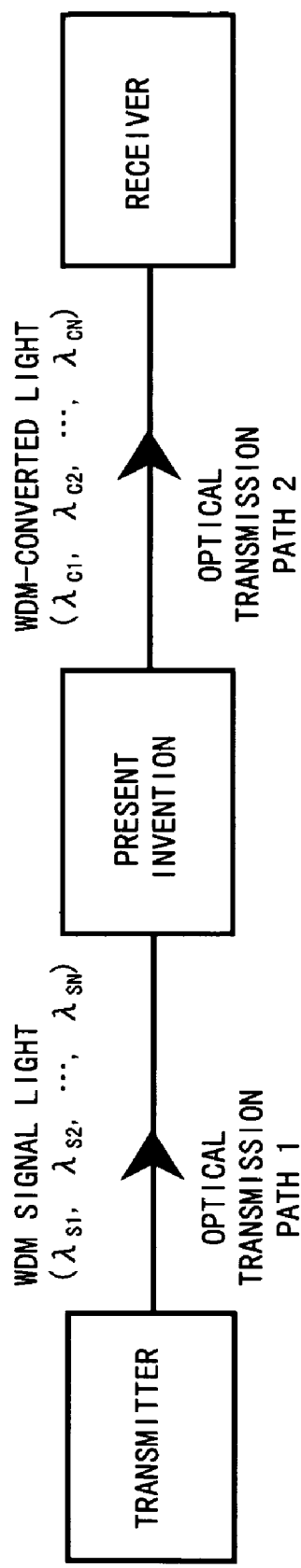
FIG. 12 shows an application example in which the embodiment of the present invention is applied to an optical communication system.

FIG. 12 shows an application example in which the embodiment of the present invention is applied to an optical communication system. After signal processing such as optical 3R regeneration is performed, in an optical repeater based on the embodiment of the present invention, for the WDM signal light which is transmitted through an optical transmission path 1 such as an optical fiber, the processed signal light is transmitted through an optical transmission path 2, and is received. It goes without saying that in the optical fiber transmission, amplifier repeated transmission using an optical amplifier is applicable.

Figure 13:
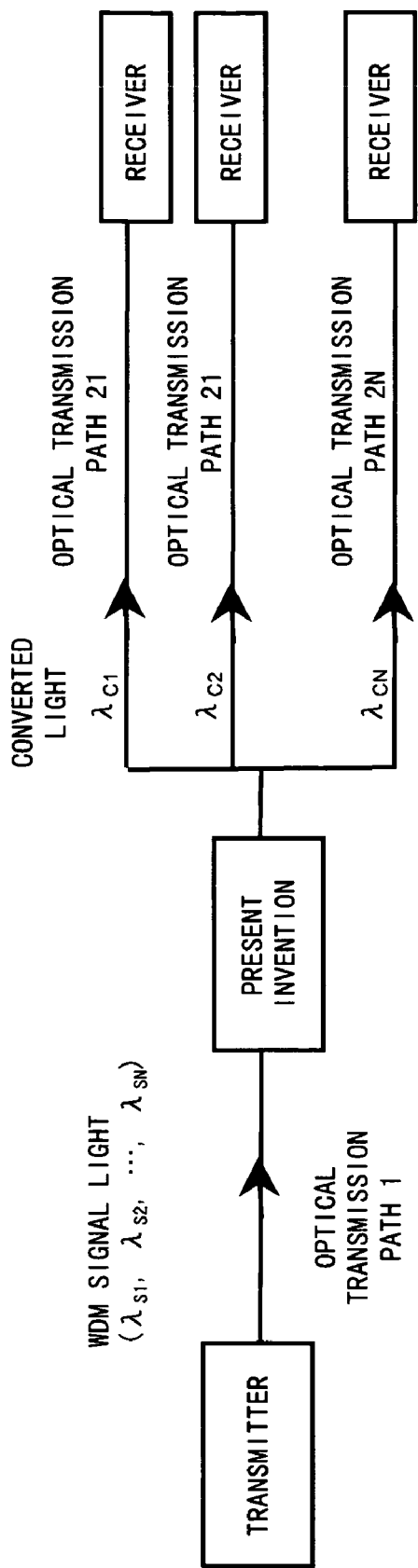
FIG. 13 is an example in which the embodiment of the present invention is applied to an optical switching node.

FIG. 13 is an example in which the embodiment of the present invention is applied to an optical switching node. After optical DEMUX or optical separation is performed for the WDM signal light which is transmitted through the optical transmission path 1 such as an optical fiber in the optical repeater based on the embodiment of the present invention, the separated light is transmitted through each optical transmission path 21, . . . , 2N, and then is received.

By applying the present invention to the nodes between a plurality of optical networks, it is possible to realize optical 3R for WDM signal light, optical separation and insertion (ADM: Add-Drop Multiplexing), wavelength conversion etc. in the form of a compact device.

What is claimed is:

1. An optical synchronizer, comprising:
   a phase modulation unit to input wavelength-division multiplexed (WDM) signal light including a plurality of pluses, each pulse having a different wavelength and performing phase modulation for applying a frequency chirp to each of the pulses of the WDM signal light depending on pulse deviation from a prescribed timing; and
   a delay unit to give a time delay corresponding to a frequency to each pulse of the WDM signal light to which the frequency chirp has been applied and conforming the timing of each pulse of the WDM signal light to a prescribed timing.

2. The optical synchronizer according to claim 1, wherein the delay unit gives not only a linear time delay but also a nonlinear time delay, and produces optical pulses which array pulses with different wavelengths in the time direction so as not to overlap each other using the time delay corresponding to the frequency.

3. A device for converting a WDM signal to an OTDM signal, comprising: an optical synchronizer according to claim 1;
   a probe light producing unit to produce probe light including a prescribed wavelength;
   and a first optical gate unit to produce optical-time-division-multiplexed (OTDM)-converted light including a prescribed wavelength from the optical pulses and probe light arrayed in the time direction.

4. The device according to claim 3, further comprising:
   a clock recovering unit to recover a clock signal from the WDM signal light of a plurality of wavelengths; and
   a second optical gate unit which makes the pulses of the clock signal pass when the OTDM-converted light and clock signal are inputted, and the pulses of the OTDM-converted light produced by the delay unit conform to the pulses of the clock signal.

5. The device according to claim 4, wherein the pulses of the clock signal are the signal in which pulses with different wavelengths are arrayed.

6. An optical separation device, comprising the device according to claims 4 or 5, wherein the clock recovering unit obtains a wavelength which a user wants to extract, or pulses having information of the channel which the user wants to extract from pulses converted into the OTDM-converted light by producing pulses whose timing conforms to pulses of the timing which the user wants to extract among pulses of the OTDM-converted light, and inputting said pulses having the information into the optical gate unit.

7. The optical synchronizer according to claim 1, wherein the phase modulation is a parabolic phase modulation centered around the prescribed timing in terms of modulation characteristics.

8. The optical synchronizer according to claim 1, wherein the phase modulation unit is the one in which the phase modulation characteristics become square characteristics for the time shift from the prescribed timing.

9. The optical synchronizer according to claim 1, wherein the phase modulation unit is an $LiNbO_3$ phase modulator.

10. The optical synchronizer according to claim 1, wherein the phase modulation unit is the one in which an $LiNbO_3$ intensity-modulator and an $LiNbO_3$ phase modulator are connected tandem, and which is configured so that the total sum of the phase modulation characteristics of both said intensity modulator and said phase modulator becomes square characteristics for the time shift for the prescribed timing.

11. The optical synchronizer according to claim 1, wherein the phase modulation unit is the one which uses the second-order or the third-order nonlinear optical effects.

12. The optical synchronizer according to claim 1, wherein the phase modulation unit is the one which uses a cross-phase modulation (XPM) in an optical fiber.

13. The optical synchronizer according to claim 12, wherein as the control light pulses for generating the cross-phase modulation, the time shape uses the pulses having square characteristics for the shift from the center.

14. The optical synchronizer according to claim 12, wherein the optical fiber is a highly-nonlinear optical fiber.

15. The optical synchronizer according to claim 12, wherein the optical fiber is a photonic crystal fiber or a Holey fiber.

16. The optical synchronizer according to claim 1, wherein the delay unit is a dispersive medium having group-velocity delay characteristics which are almost linear for the changes of a frequency.

17. The optical synchronizer according to claim 16, wherein the influence of dispersion slope is compensated for by the medium having a dispersion slope whose sign differs from the dispersion slope of the dispersive medium.

18. The wavelength division multiplexing to time division multiplexing conversion device according to claim 3, wherein a waveform conversion unit for making the optical pulse waveform of the OTDM-converted light flattened-top is further provided.

19. The optical regeneration device according to claim 3, wherein the first optical gate comprises an optical AND circuit.

20. The optical regeneration device according to claim 4, wherein the second optical gate comprises an optical AND circuit.

21. The optical synchronizer according to claim 1, wherein the delay unit is an optical fiber.

* * * * *

UNITED STATES PATENT AND TRADEMARK OFFICE
CERTIFICATE OF CORRECTION

PATENT NO.         : 7,715,724 B2
APPLICATION NO.    : 11/057365
DATED              : May 11, 2010
INVENTOR(S)        : Shigeki Watanabe et al.

It is certified that error appears in the above-identified patent and that said Letters Patent is hereby corrected as shown below:

Column 10, Line 58, change "LiNbO.sub.3" to --LiNnO$_3$--.

Column 10, Line 61, change "LiNbO.sub.3" to --LiNnO$_3$--.

Column 10, Line 62, change ""LiNbO.sub.3" to --LiNnO$_3$--.

Signed and Sealed this

Seventeenth Day of August, 2010

David J. Kappos
*Director of the United States Patent and Trademark Office*